US011951615B2

(12) United States Patent
Hirose et al.

(10) Patent No.: US 11,951,615 B2
(45) Date of Patent: Apr. 9, 2024

(54) MALFUNCTION-TYPE DETERMINATION DEVICE AND MALFUNCTION-TYPE DETERMINATION METHOD

(71) Applicant: Nissan Motor Co., Ltd., Kanagawa (JP)

(72) Inventors: Satoru Hirose, Kanagawa (JP); Toru Takagi, Kanagawa (JP); Kouichi Oomori, Kanagawa (JP)

(73) Assignee: Nissan Motor Co., Ltd., Kanagawa (JP)

(*) Notice: Subject to any disclaimer, the term of this patent is extended or adjusted under 35 U.S.C. 154(b) by 362 days.

(21) Appl. No.: 16/975,857

(22) PCT Filed: Feb. 28, 2018

(86) PCT No.: PCT/JP2018/007567
§ 371 (c)(1),
(2) Date: Aug. 26, 2020

(87) PCT Pub. No.: WO2019/167180
PCT Pub. Date: Sep. 6, 2019

(65) Prior Publication Data
US 2020/0406483 A1 Dec. 31, 2020

(51) Int. Cl.
*B25J 19/00* (2006.01)
*G01L 5/00* (2006.01)
(Continued)

(52) U.S. Cl.
CPC ........ *B25J 19/0066* (2013.01); *G01L 5/0076* (2013.01); *G01M 13/028* (2013.01); *G01M 13/045* (2013.01); *G01P 15/00* (2013.01)

(58) Field of Classification Search
CPC ..... B25J 19/0066; B25J 19/06; G01L 5/0076; G01L 5/226; G01P 15/00; G01M 3/025;
(Continued)

(56) References Cited

U.S. PATENT DOCUMENTS 5,819,202 A * 10/1998 Sato ................... G05B 19/4061
700/184
6,782,344 B2 8/2004 Ito et al.
(Continued)

FOREIGN PATENT DOCUMENTS

| CN | 106845526 A | 6/2017 |
| JP | H02277968 A | 11/1990 |

(Continued)

OTHER PUBLICATIONS

Jun, Z. et al.; "Process Fault Diagnosis in Chemical Industry Safety Analysis"; Beijing Metallurgical Industry Press 2MI8, Aug. 2008, pp. 104-106 (11 pages).

*Primary Examiner* — Alexander Satanovsky
(74) *Attorney, Agent, or Firm* — Osha Bergman Watanabe & Burton LLP (57) ABSTRACT

A driving force sensor detects a driving force in a rotating mechanism provided in an apparatus. A vibration sensor detects vibrations of the apparatus. A control unit determines a type of a malfunction of the apparatus in accordance with a combination of the detected driving force and the detected vibrations.

10 Claims, 7 Drawing Sheets

(51) Int. Cl.
*G01M 13/028* (2019.01)
*G01M 13/045* (2019.01)
*G01P 15/00* (2006.01)

(58) Field of Classification Search
CPC .............. G01M 13/005; G01M 13/028; G01M 13/045; G01M 15/05; G01M 15/12; G01M 7/00; H02P 29/024; G05B 19/19
See application file for complete search history.

(56) References Cited

U.S. PATENT DOCUMENTS

| | | | |
|---|---|---|---|
| 9,321,177 | B2 | 4/2016 | Ikeda et al. |
| 2002/0095986 | A1* | 7/2002 | Ito ..................... F16K 37/0083 |
| | | | 73/168 |
| 2007/0067678 | A1* | 3/2007 | Hosek ................ G05B 23/0235 |
| | | | 714/25 |
| 2012/0065781 | A1* | 3/2012 | Ikeda ..................... B25J 9/1674 |
| | | | 700/261 |
| 2016/0025592 | A1* | 1/2016 | Lee ...................... G01N 29/045 |
| | | | 73/645 |
| 2017/0293862 | A1* | 10/2017 | Kamiya ............. G01N 29/4481 |

FOREIGN PATENT DOCUMENTS

| | | | | |
|---|---|---|---|---|
| JP | H068111 | A | 1/1994 | |
| JP | H06-117968 | A | 4/1994 | |
| JP | 2002-130531 | A | 5/2002 | |
| JP | 3386593 | * | 3/2003 | .............. G01L 3/14 |
| JP | 2007-64852 | A | 3/2007 | |
| JP | 2010-206964 | A | 9/2010 | |
| JP | 2010288352 | * | 12/2010 | ............. H02K 15/02 |
| JP | 2012-61535 | A | 3/2012 | |
| JP | 2017-027328 | A | 2/2017 | |
| JP | 2017-188030 | A | 10/2017 | |
| KR | 2010019762 | * | 2/2010 | ............. F16H 57/04 |
| WO | 2017/179238 | A1 | 10/2017 | |

* cited by examiner

| DRIVING FORCE \ ACCELERATION | INCREASE | NO CHANGE | DECREASE |
|---|---|---|---|
| INCREASE | INTERFERENCE BETWEEN COMPONENTS | ABNORMALITY IN IRON FILINGS CONCENTRATION | ABNORMALITY IN ROTATING MECHANISM |
| NO CHANGE | ABNORMALITY IN MECHANICAL PART | NORMAL STATE | ABNORMALITY IN COMPONENT OTHER THAN ROTATING MECHANISM OR REDUCER |
| DECREASE | GREASE SHORTAGE | GREASE LEAKAGE | REFILLING WITH GREASE AND CONFORMATION OF EFFECT |

MALFUNCTION-TYPE DETERMINATION DEVICE AND MALFUNCTION-TYPE DETERMINATION METHOD

TECHNICAL FIELD

The present invention relates to a malfunction-type determination device and a malfunction-type determination method.

BACKGROUND ART

A technique is known that predicts a trouble with a main axis or a motor, which drives the main axis of a work machine, by use of output data of a motor control apparatus for controlling the motor, output data of a detection device for detecting the state of the motor, and output data of a measurement device for measuring the state of the main axis or the motor.

CITATION LIST

Patent Literature

Patent Document 1: Japanese Unexamined Patent Application Publication No. 2017-188030

SUMMARY OF INVENTION

Technical Problem

The above conventional technique fails to determine a type of a malfunction caused in an apparatus such as the work machine so as to do maintenance of the apparatus depending on the type of a malfunction.

In view of the foregoing problem, the present invention provides a malfunction-type determination device and a malfunction-type determination method capable of determining a type of a malfunction of an apparatus.

Technical Solution

A malfunction-type determination device according to an aspect of the present invention includes a driving force sensor configured to detect a driving force in a rotating mechanism provided in an apparatus, a vibration sensor configured to detect vibrations of the apparatus, and a control unit configured to determine a type of a malfunction in the apparatus in accordance with a combination of the driving force and the vibrations.

Advantageous Effects

The present invention can determine the type of a malfunction of the apparatus.

DESCRIPTION OF EMBODIMENTS

An embodiment will be described below with reference to the drawings. The same elements illustrated in the drawings are indicated by the same reference numerals, and overlapping explanations are not made below.

Figure 1:
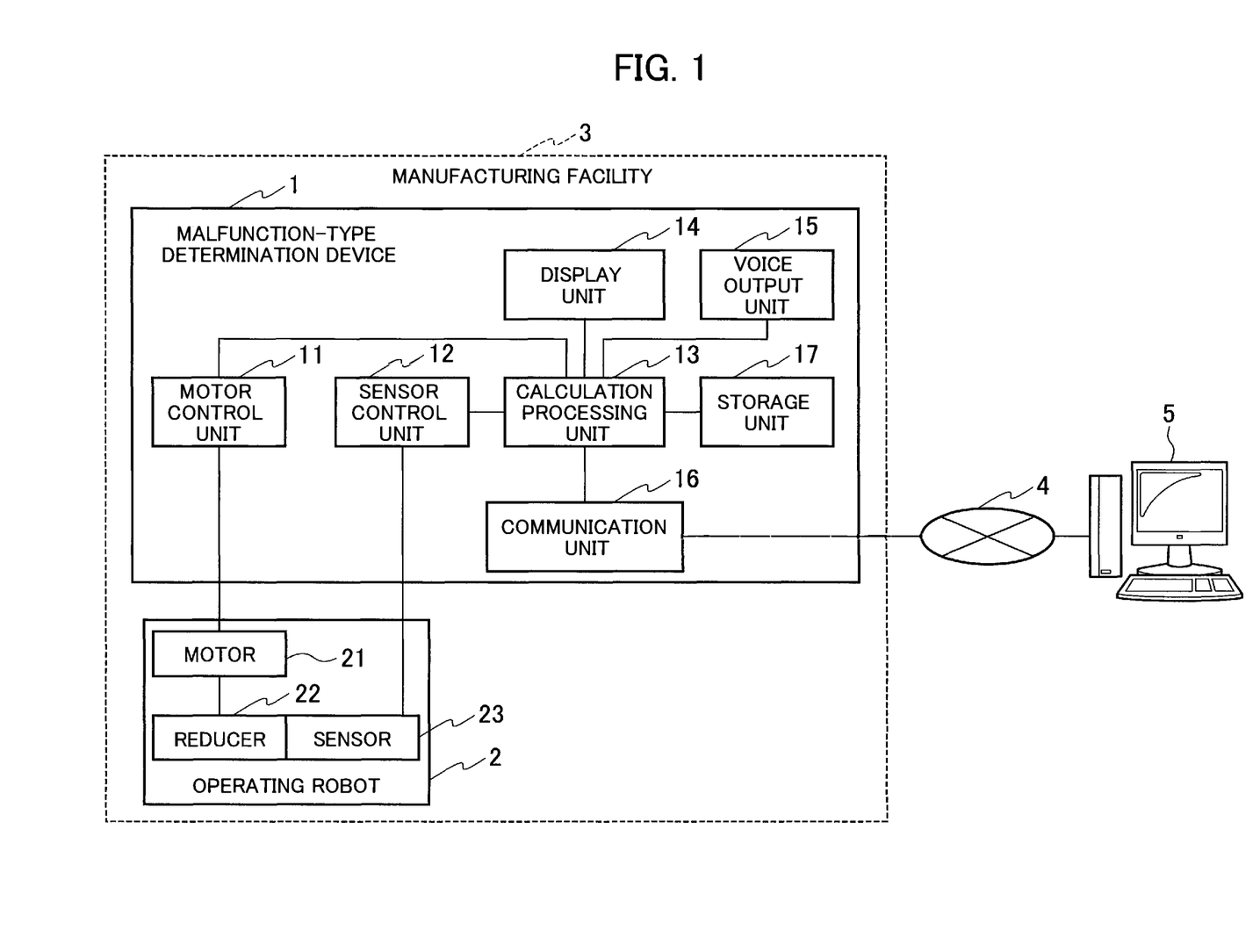
FIG. 1 is a diagram illustrating a configuration of a system including a malfunction-type determination device according to an embodiment.

FIG. 1 is a diagram illustrating a system including a malfunction-type determination device according to the embodiment.

The malfunction-type determination device 1 is a device for determining a type of a malfunction of an apparatus, in particular, determining the type of a malfunction of the apparatus such as an operating robot 2 of a multi-axis machine for assembling a vehicle, for example. The malfunction-type determination device 1 and the operating robot 2 are installed in a manufacturing facility 3, while the malfunction-type determination device 1 is connected to a computer 5 via a communication line 4.

The operating robot 2 is an apparatus including a rotating mechanism (such as a motor; hereinafter referred to as a motor 21) and a mechanism (such as a reducer; hereinafter referred to as a reducer 22) for converting a torque of the motor 21 to a higher torque to move an object with a heavy load by an arm of the operation robot 2, for example.

A sensor 23 for detecting an acceleration of a part adjacent to the reducer 22 so as to serve as a vibration sensor for detecting vibrations of the part is arranged adjacent to the reducer 22. The sensor 23 generates a waveform indicating the acceleration in association with the vibrations at the arranged part of the sensor 23, and samples the waveform at a predetermined sampling cycle to output an acceleration signal M1. The sensor 23 is not limited to the sensor for detecting the acceleration, and may be a sensor for detecting a velocity and a displacement of the arranged part so as to detect a magnitude of vibrations. Various types of sensors capable of acquiring a change in attitude in a time-series manner may be used, such as a piezoelectric sensor, an angular velocity sensor, and a gyro sensor.

Figure 2:
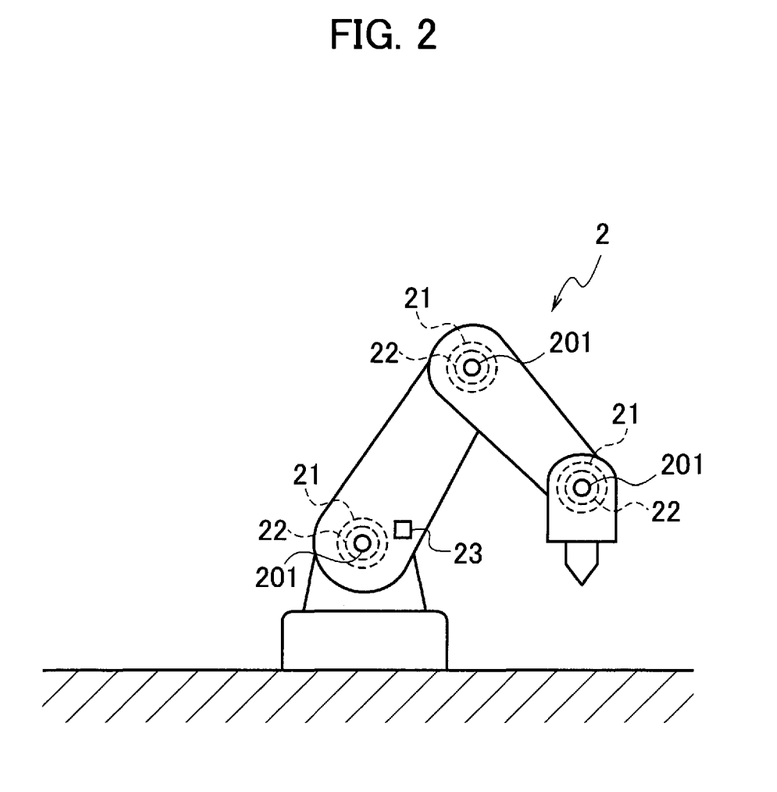
FIG. 2 is a diagram illustrating an arrangement example of a sensor 23 in an operating robot 2.

FIG. 2 is a diagram illustrating an arrangement example of the sensor 23 in the operating robot 2.

The operating robot 2 includes three rotating axes 201, for example, each being provided with the motor 21 and the reducer 22. The sensor 23 is arranged adjacent to the reducer 22 provided in one of the rotating axes 201, for example. The sensor 23 is arranged adjacent to the reducer 22, which is not easy to replace as compared with the motor 21, so that the sensor 23 can detect a malfunction of the reducer 22 at an early stage.

The explanations are further made below while returning to FIG. 1.

The malfunction-type determination device 1 includes a motor control unit 11, a sensor control unit 12, a calculation processing unit 13, a display unit 14, a voice output unit 15, a communication unit 16, and a storage unit 17. The malfunction-type determination device 1 is herein presumed to include the sensor 23.

The malfunction-type determination device 1 includes a general-purpose microcomputer including a central processing unit (CPU), a memory, and an input-output unit. A computer program (a malfunction-type determination program) is installed on the microcomputer so as to function as the malfunction-type determination device. The microcomputer functions as a plurality of information processing circuits (11 to 13 and 16) included in the malfunction-type determination device when the computer program is executed. While the embodiment is illustrated with the case in which the software is installed to fabricate the information processing circuits (11 to 13 and 16) included in the malfunction-type determination device 1, dedicated hardware for executing each information processing as described below can be prepared to compose the information processing circuits (11 to 13 and 16). The respective information processing circuits (11 to 13 and 16) may be composed of individual hardware.

The motor control unit 11 drives the motor 21 when the operating robot 2 starts operating. The operation of the motor 21 causes the reducer 22 to operate in association with the motor 21. The motor control unit 11 generates a driving force signal M2 indicating a driving force caused by a disturbance in the motor 21 due to a current flowing through the motor 21 in operation, which is a magnitude of a fluctuation component (also called a disturbance torque) with respect to a control value of a torque (hereinafter referred to as a driving force), and outputs the signal to the calculation processing unit 13. The motor control unit 11 herein can be referred to as a driving force sensor for detecting the driving force of the motor 21.

The sensor control unit 12 causes the sensor 23 to detect an acceleration of the reducer 22 during the operation of the reducer 22. The sensor control unit 12 receives the acceleration signal M1 indicating the acceleration of the reducer 22 from the sensor 23, and transfers the signal to the calculation processing unit 13.

The calculation processing unit 13 is a control unit which receives the acceleration signal M1 and the driving force signal M2, and determines whether the operating robot 2 has a malfunction in accordance with the acceleration signal M1 or the driving force signal M2. The calculation processing unit 13 (the control unit) also determines a type of a malfunction of the operating robot 2 in accordance with a combination of the acceleration indicated by the acceleration signal M1 and the driving force indicated by the driving force signal M2.

The display unit 14 displays the acceleration signal M1, the driving force signal M2, the result of determination of whether the operating robot 2 has a malfunction, and the type of a malfunction of the operating robot 2 (hereinafter, collectively referred to as a measurement result 140) in real time, and is a liquid crystal monitor, for example. The display unit 14 displays the measurement result 140 regardless of whether the operating robot 2 has a malfunction.

The voice output unit 15 notifies an operator of a malfunction with an alarm sound or vibrations when the operating robot 2 is determined to have a malfunction, and is a speaker, for example.

The communication unit 16 sends the measurement result 140 to the computer 5 located in a remote place (the outside), and is a router in a wired LAN or a wireless (such as Wi-Fi) router, for example.

The storage unit 17 stores the acceleration signal M1 and the driving force signal M2 received. The storage unit 17 includes a normal model preliminarily generated according to the frequency characteristics of the acceleration signal M1 or the driving force signal M2 acquired when the operating robot 2 is in a normal state. The normal model includes a threshold used when determining whether the operating robot 2 is in the normal state.

The storage unit 17 also preliminarily stores the types of malfunction of the operating robot 2 corresponding to the respective combinations of the acceleration signal M1 and the driving force signal M2.

Figure 3:
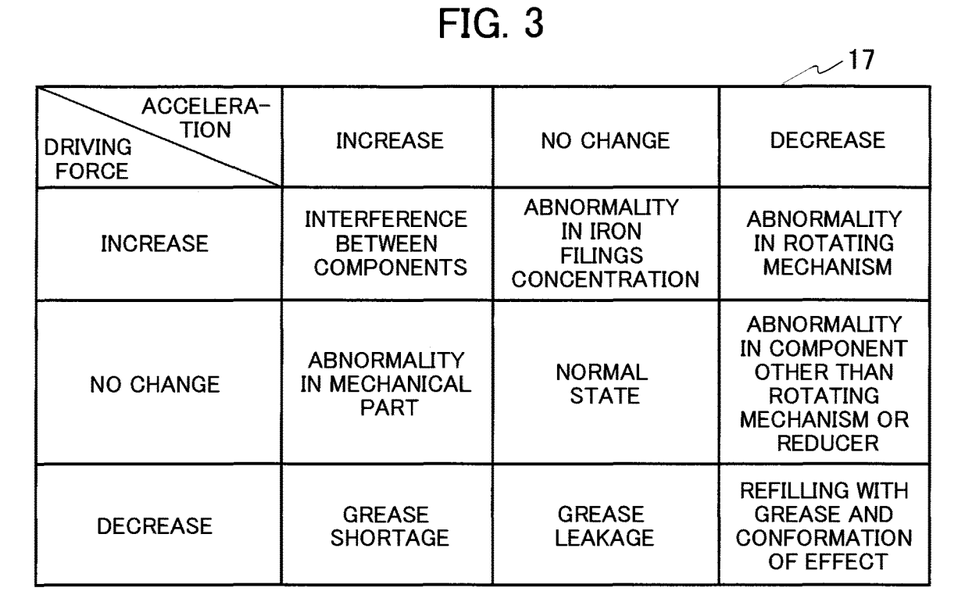
FIG. 3 is a diagram illustrating types of malfunction stored in a storage unit 17.

FIG. 3 is a diagram illustrating the types of malfunction stored in the storage unit 17. The storage unit 17 stores the respective types of malfunction in association with an inclination of a change in the acceleration and the driving force as illustrated in FIG. 3.

The term "increase" of the "acceleration" indicates an inclination toward an increase in the acceleration indicated by the acceleration signal M1 with a lapse of time. The term "decrease" of the "acceleration" indicates an inclination toward a decrease in the acceleration with a lapse of time. The term "no change" of the "acceleration" indicates no inclination toward the increase in the acceleration or no inclination toward the decrease in the acceleration. The term "increase" of the "driving force" indicates an inclination toward an increase in the driving force indicated by the driving force signal M2 with a lapse of time. The term "decrease" of the "driving force" indicates an inclination toward a decrease in the driving force with a lapse of time. The term "no change" of the "driving force" indicates no inclination toward the increase in the driving force or no inclination toward the decrease in the driving force. The increase or the decrease in the driving force may be caused due to the addition of the disturbance to the original driving force.

The term "acceleration" described above refers to the magnitude of the acceleration indicated by the acceleration signal M1. The embodiment is illustrated with a case of acquiring a temporal change in the "acceleration", which is an example of detecting a temporal change in magnitude of vibrations, but is not limited to this case. The temporal change in the magnitude of vibrations may be detected in accordance with a signal indicating an angular velocity, a velocity, a pressure, or a displacement, for example, other than the "acceleration".

The term "increase" in the "acceleration" described above refers to a state in which the magnitude of vibrations increases with the lapse of time, the term "no change" in the "acceleration" refers to a state in which the magnitude of vibrations has almost no change with the lapse of time, and the term "decrease" in the "acceleration" refers to a state in which the magnitude of vibrations decreases with the lapse of time.

As illustrated in FIG. 3, the combination of the "no change" in the "acceleration" and the "decrease" in the "driving force" corresponds to a first malfunction, "grease leakage (leakage of grease) (in the apparatus)" (a type of a malfunction). The apparatus is the operating robot 2, which is also applied to the following explanations.

The inside of the reducer 22 is filled with grease, which has lubrication and cooling functions, for example, for a gear or a bearing as a movable part. The grease may leak out of a case of the reducer 22 because of some reasons. The leakage of the grease reduces the pressure inside the case to reduce a load on the motor 21, leading to a decrease in the driving force. The acceleration rarely changes, since the mechanical vibrations in the reducer 22 do not greatly change. In view of such characteristics, the combination of the "no change" in the "acceleration" and the "decrease" in the "driving force" corresponds to the "grease leakage".

The combination of the "increase" in the "acceleration" and the "no change" in the "driving force" corresponds to a second malfunction, "abnormality in a mechanical part (in the apparatus)" (a type of a malfunction). The mechanical part is the gear, for example.

When a malfunction is caused in the mechanical part because of abrasion on the gear or the bearing inside the reducer 22 or because of scratches or cracks caused in part of the gear or the bearing, vibrations in a particular frequency band increase. This leads to an increase in the acceleration. The driving force of the motor 21 rarely changes, since slight abrasion or small scratches do not have a large influence on the rotation of the motor 21. In view of such characteristics, the combination of the "increase" in the "acceleration" and the "no change" in the "driving force" corresponds to the "abnormality in the mechanical part".

The combination of the "no change" in the "acceleration" and the "increase" in the "driving force" corresponds to a third malfunction, "concentration abnormality of iron filings (abnormality in concentration of iron filings in the apparatus)" (a type of a malfunction).

It is known that a risk that the reducer 22 is damaged increases when iron filings are caused due to abrasion on the gear or the bearing inside the reducer 22 to result in an increase in the amount and concentration of iron filings. When the concentration of iron filings in the grease increases, the lubrication performance of the grease decreases to increase the load on the motor 21, leading to an increase in the driving force. The change in the acceleration is quite small since the vibrations do not increase as much as the case of the abnormality in the mechanical part, regardless of the decrease in the lubrication performance of the grease. In view of such characteristics, the combination of the "no change" in the "acceleration" and the "increase" in the "driving force" corresponds to the "concentration abnormality of iron filings". The phrase "concentration abnormality of iron filings" may be referred to also as an "increase in the concentration of iron filings".

The combination of the "increase" in the "acceleration" and the "increase" in the "driving force" corresponds to a fourth malfunction, "interference between components (in the apparatus)" (a type of a malfunction). The term "interference" refers to a state of a contact between the components which should not come into contact with each other. The term "interference" encompasses a crash between the components.

The arm of a welding robot, which is the operating robot 2, is caused to perform preliminarily programmed operations at predetermined timings. If another robot operating in association with the operating robot 2 stops operating because of a breakdown, for example, the operating timings are changed to lead to a crash between the respective arms, causing each arm to crash into a workpiece. This malfunction increases the driving force since the load on the motor 21 increases. The crash further causes vibrations in the mechanical part, which increases the acceleration for a short period of time. In view of such characteristics, the combination of the "increase" in the "acceleration" and the "increase" in the "driving force" corresponds to the "interference between the components".

The combination of the "increase" in the "acceleration" and the "decrease" in the "driving force" corresponds to a fifth malfunction, "grease shortage (lack of grease in the apparatus)" (a type of a malfunction).

The combination of the "decrease" in the "acceleration" and the "increase" in the "driving force" corresponds to a sixth malfunction, "abnormality in the rotating mechanism" (a type of a malfunction). The rotating mechanism is the motor 21, which is also applied to the following explanations.

The combination of the "decrease" in the "acceleration" and the "no change" in the "driving force" corresponds to a seventh malfunction, "abnormality in the component other than the rotating mechanism or other than the reducer connected to the rotating mechanism" (a type of a malfunction).

The combination of the "no change" in the "acceleration" and the "no change" in the "driving force" corresponds to a condition, "normal state (of the apparatus) (indicating that the apparatus is in a normal state)". The combination of the "decrease" in the "acceleration" and the "decrease" in the "driving force" corresponds to a condition, "need for refilling with grease and confirmation of the effect (indicating that grease needs to be refilled to then confirm the effect).

The explanations are further made below while returning to FIG. 1.

The computer 5 is used by an observing person or a maintenance person who observes the operating robot 2 in the remote place, and receives and displays the measurement result 140 to notify the observing person and the like of a malfunction and the type of the malfunction with an image, sound or voice, or vibrations.

Figure 4:
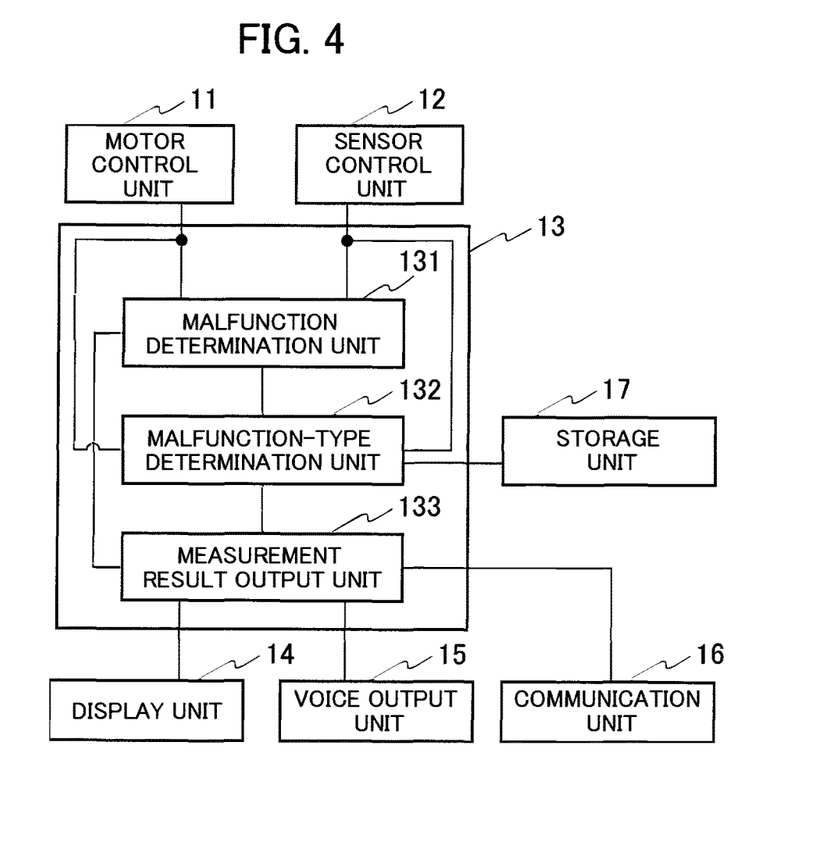
FIG. 4 is a block diagram illustrating a schematic configuration of a calculation processing unit 13.

FIG. 4 is a block diagram illustrating a schematic configuration of the calculation processing unit 13.

The calculation processing unit 13 includes a malfunction determination unit 131, a malfunction-type determination unit 132, and a measurement result output unit 133.

The malfunction determination unit 131 determines whether the operating robot 2 has a malfunction in accordance with the acceleration signal M1 received from the motor control unit 11 or the driving force signal M2 received from the sensor control unit 12.

The malfunction-type determination unit 132 determines a type of a malfunction of the operating robot 2 in accordance with the acceleration signal M1, the driving force signal M2, and the types of malfunction stored in the storage unit 17.

The measurement result output unit 133 displays the measurement result 140 on the display unit 14. The measurement result output unit 133 causes the voice output unit 15 to produce an alarm sound or vibrations when the operating robot 2 is determined to have a malfunction. The measurement result output unit 133 outputs the measurement result 140 to the communication unit 16.

Figure 5:
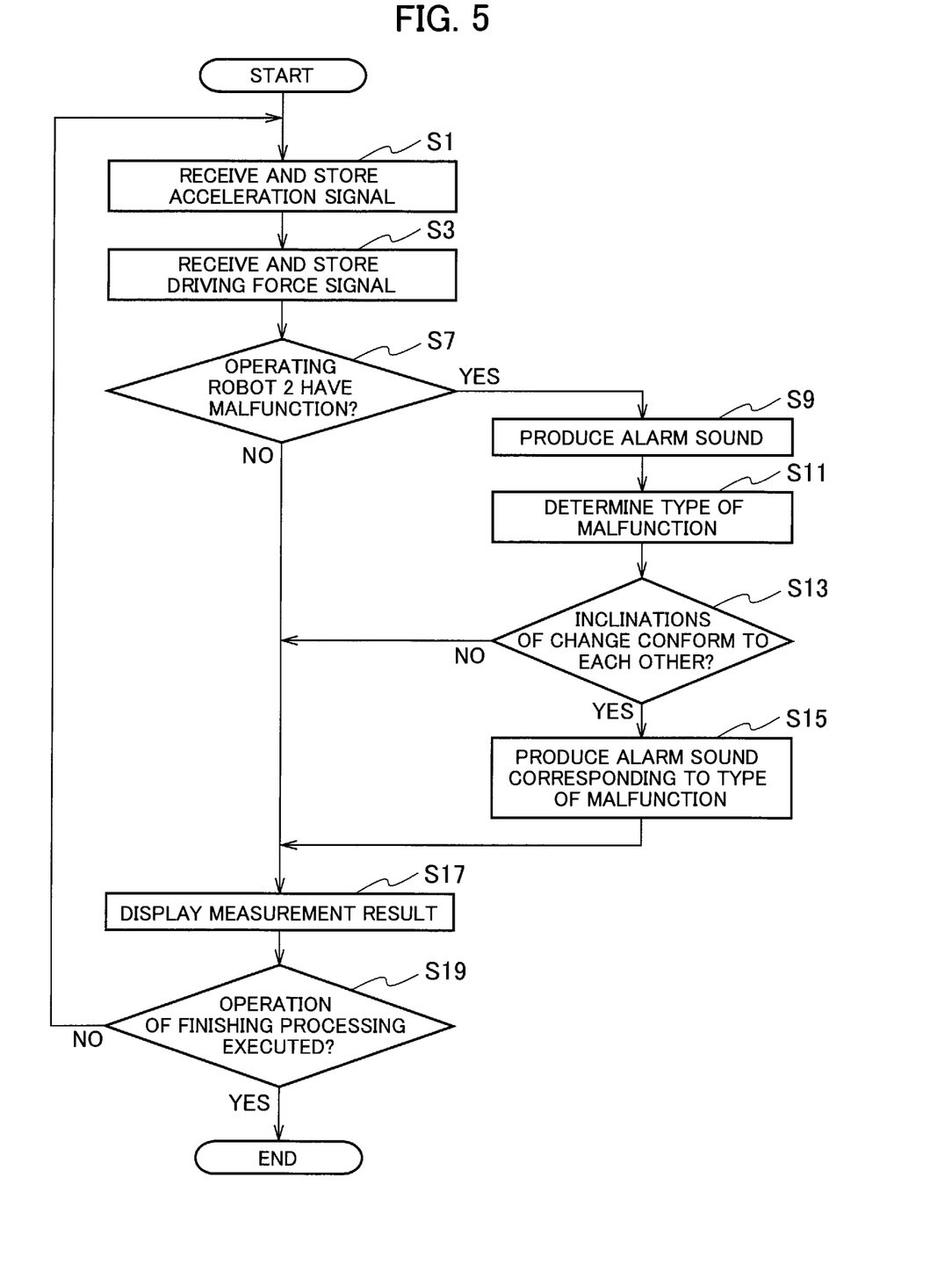
FIG. 5 is a flowchart showing a process performed by the calculation processing unit 13.

FIG. 5 is a flowchart illustrating a process performed by the calculation processing unit 13.

The malfunction determination unit 131 receives the acceleration signal M1 from the sensor control unit 12 to store the signal in the storage unit 17 (S1). The malfunction determination unit 131 receives the driving force signal M2 from the motor control unit 11 to store the signal in the storage unit 17 (S3).

When the operating robot 2 is determined to be in the normal state in the latter determination described below, the normal model and the threshold can be updated in accordance with the sampling signals stored in the storage unit 17.

The malfunction determination unit 131 then determines whether the operating robot 2 has a malfunction (S7).

In step S7, the malfunction determination unit 131 first calculates frequency characteristics (hereinafter referred to as frequency characteristics f1) from the acceleration signal M1 or the driving force signal M2 through fast Fourier transform (FFT), for example.

The normal model generated in accordance with the frequency characteristics acquired by the same method when the operating robot 2 is in the normal state and preliminarily stored in the storage unit 17, is read out from the storage unit 17.

The normal model includes frequency characteristics U' of an average and frequency characteristics $\delta^2$ of a variance generated in accordance with the frequency characteristics acquired when the operating robot 2 is in the normal state.

The frequency characteristics U' of the average is acquired such that an average of values is calculated in a predetermined range in the frequency characteristics when the operating robot 2 is in the normal state, and the calculation of the average is repeated along the axis (the horizontal axis) of the frequency in the predetermined range. Different ranges may overlap with each other.

The frequency characteristics $\delta^2$ of the variance is acquired such that a variance of values is calculated in a predetermined range in the frequency characteristics when the operating robot 2 is in the normal state, and the calculation of the variance is repeated along the axis (the horizontal axis) of the frequency in the predetermined range. Different ranges may overlap with each other.

In step S7, an average of values is calculated in a predetermined range in the frequency characteristics f1, and the calculation of the average is repeated along the axis (the horizontal axis) of the frequency in the predetermined range so as to acquire the frequency characteristics f1' of the average, as in the case of the frequency characteristics U' of the average.

Next, the frequency characteristics of a square of a difference between the frequency characteristics U' and the frequency characteristics f1' are obtained. The obtained frequency characteristics are then divided by the frequency characteristics $\delta^2$ of the variance, so as to correct the obtained frequency characteristics.

Next, the values of the respective frequencies in the corrected frequency characteristics are integrated. When the integrated value is greater than the threshold of the normal model, the operating robot 2 is determined to have a malfunction (S7: YES). When the integrated value is smaller than or equal to the threshold, the operating robot 2 is determined to be in the normal state (S7: NO).

Alternatively, the determination in step S7 may be made by use of the acceleration signal M1, and the determination in step S7 may further be made by use of the driving force signal M2, so as to determine that the operating robot 2 has a malfunction when the values obtained in the respective determinations are greater than the threshold, and determine that the operating robot 2 is in the normal state when the values are smaller than or equal to the threshold. Alternatively, the operating robot 2 may be determined to have a malfunction when the value in at least one of the determinations is determined to be greater than the threshold.

The normal model may include the frequency characteristics of the median, the maximum value, or the minimum value of the acceleration or the driving force when the operating robot 2 is in the normal state, so as to make the determination by use of these elements in step S7.

Alternatively, time-series data of the acceleration or the driving force may be modeled into an AR model, for example, to calculate a difference between the corresponding model and the model when the operating robot 2 is in the normal state, so as to compare the difference with the threshold.

Alternatively, an average or a variance of the detection values in the acceleration signal M1 or the driving force signal M2 may be obtained to determine whether the average or the variance is included in a predetermined range so as to determine whether the operating robot 2 has a malfunction.

The measurement result output unit 133 causes the voice output unit 15 to produce an alarm sound or vibrations (S9) when the operating robot 2 is determined to have a malfunction (S7: YES).

The malfunction-type determination unit 132 determines the type of the malfunction of the operating robot 2 depending on the combination of the acceleration indicated by the acceleration signal M1 and the driving force indicated by the driving force signal M2 (S11).

The determination in step S11 is further described in detail below.

A method of detecting the inclination of the change in the acceleration or the driving force is described with reference to FIG. 6.

Figure 6:
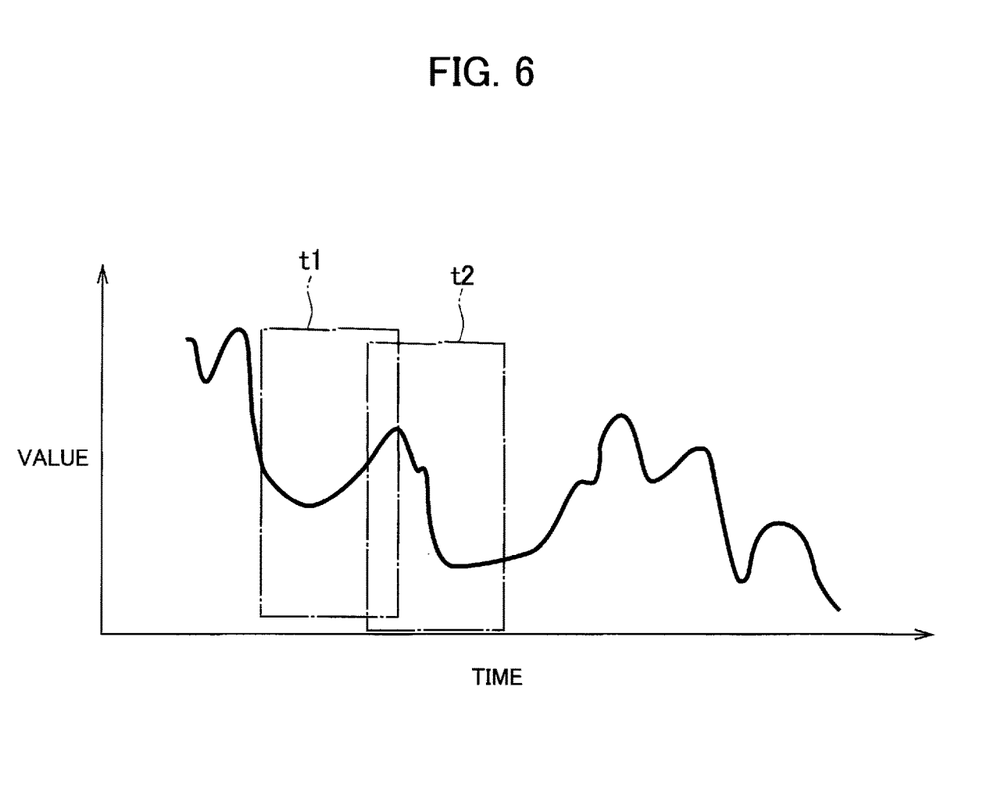
FIG. 6 is a diagram illustrating a method of detecting an inclination of a change in acceleration or driving force.

In FIG. 6, the axis of abscissas is a time, and the axis of ordinates is a value of the acceleration or the driving force. The malfunction-type determination unit 132 first calculates an average d1 of values in a period t1, and calculates an average d2 of values in a period t2 after the period t1, so as to obtain d=d2/d1. The malfunction-type determination unit 132 determines that the acceleration or the driving force shows no inclination toward either the increase or the decrease when the condition $(1-\Delta) \leq d \leq (1+\Delta)$ is fulfilled. The malfunction-type determination unit 132 determines that the acceleration or the driving force shows the inclination toward the increase when the condition $d > (1+\Delta)$ is fulfilled, and determines that the acceleration or the driving force shows the inclination toward the decrease when the condition $d < (1-\Delta)$ is fulfilled. The symbol $\Delta$ is a predetermined value (such as 0.1).

In step S11, the malfunction-type determination unit 132 determines the type of the malfunction depending on the inclination of the change in the acceleration and the driving force detected as described above and the contents stored in the storage unit 17 as shown in FIG. 3. The malfunction-type determination unit 132 determines whether the inclination of the change in the acceleration and the driving force conforms to the inclination of any change stored in the storage unit 17 so as to determine the type of the malfunction when the respective inclinations conform to each other.

In particular, when the "no change" in the "acceleration" and the "decrease" in the "driving force" are detected, the "grease leakage in the apparatus" is determined to be caused since the inclination of the change corresponding to this malfunction is also stored in the storage unit 17.

When the "increase" in the "acceleration" and the "no change" in the "driving force" are detected, the "abnormality in the mechanical part in the apparatus" is determined to be caused since the inclination of the change corresponding to this malfunction is also stored in the storage unit 17.

When the "no change" in the "acceleration" and the "increase" in the "driving force" are detected, the "concentration abnormality of iron filings in the apparatus" is determined to be caused since the inclination of the change corresponding to this malfunction is also stored in the storage unit 17.

When the "increase" in the "acceleration" and the "increase" in the "driving force" are detected, the "interference between the components in the apparatus" is determined to be caused since the inclination of the change corresponding to this malfunction is also stored in the storage unit 17.

When the "increase" in the "acceleration" and the "decrease" in the "driving force" are detected, the "lack of grease in the apparatus" is determined to be caused since the inclination of the change corresponding to this malfunction is also stored in the storage unit 17.

When the "decrease" in the "acceleration" and the "increase" in the "driving force" are detected, the "abnormality in the rotating mechanism" is determined to be caused since the inclination of the change corresponding to this malfunction is also stored in the storage unit 17.

When the "decrease" in the "acceleration" and the "no change" in the "driving force" are detected, the "abnormality in the component other than the rotating mechanism or other than the reducer connected to the rotating mechanism" is determined to be caused since the inclination of the change corresponding to this malfunction is also stored in the storage unit 17.

As described above, the malfunction-type determination unit 132 determines that the malfunction corresponding to the inclination of the change stored is caused when the inclination of the change in the acceleration and the driving force detected conforms to the inclination of the change corresponding to the type of the malfunction stored in the storage unit 17.

The measurement result output unit 133 causes the voice output unit 15 to produce an alarm sound or vibrations corresponding to the type of the malfunction determined (S15) when the inclination of the change in the acceleration and the driving force detected conforms to the inclination of the change stored in the storage unit 17 (S13: YES).

The process proceeds to step S17 after the execution of step S15, or when the operating robot 2 is determined to be in the normal state (S7: NO) or when the inclination of the change detected does not conform to the inclination of the change stored in the storage unit 17 (S13: NO).

In step S17, the measurement result output unit 133 displays the measurement result 140, which includes the acceleration signal M1, the driving force signal M2, the result of determination of whether the operating robot 2 has a malfunction, and the type of the malfunction of the operating robot 2, on the display unit 14 (S17). The measurement result output unit 133 thus outputs the type of the malfunction determined to the display unit 14. The measurement result output unit 133 also outputs the measurement result 140 to the communication unit 16.

The communication unit 16 sends the measurement result 140 to the computer 5 (S17), namely, outputs the type of the malfunction determined to the computer 5. The computer 5 displays the measurement result 140. The computer 5 produces sound, voice, or vibrations when the operating robot 2 has a malfunction. The observing person or the maintenance person can confirm the determination of malfunction of the operating robot 2 and the type of the malfunction through the measurement result 140 or the produced sound.

Next, the operator in the manufacturing facility 3, for example, is determined whether to perform the operation for finishing the process on the malfunction-type determination device 1 (S19). The process returns to step S1 when the operation is not performed yet, and the process ends when the operation is performed.

Figure 7:
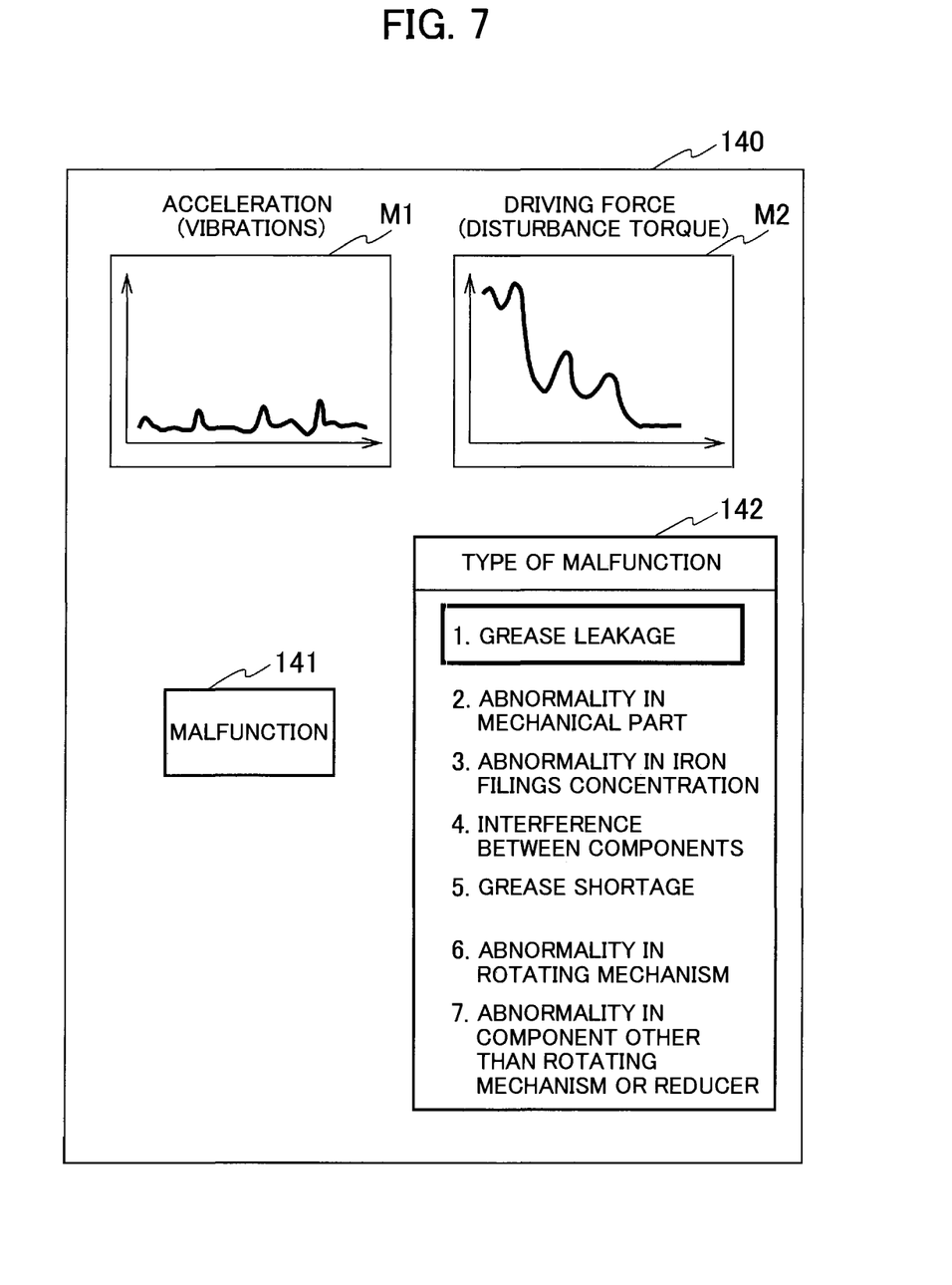
FIG. 7 is a diagram illustrating a displaying example of a measurement result 140.

FIG. 7 is a diagram illustrating a display example of the measurement result 140. The display unit 14 and the computer 5 display images as the measurement result 140 as illustrated in FIG. 7, for example.

The acceleration signal M1 and the driving force signal M2 are displayed as the measurement result 140 on the displaying region of the display unit 14 or the computer 5.

In addition, display information 141 indicating that the operating robot 2 has a malfunction is also displayed when the malfunction of the operating robot 2 is detected. When the operating robot 2 is determined to be in the normal state, the information indicating that the operating robot 2 is in the normal state is displayed.

In addition, display information 142 indicating the type of the malfunction of the operating robot 2 is displayed when the inclination of the change in the acceleration and the driving force is determined to conform to the inclination of the change stored in the storage unit 17 in step S11, for example.

The operator in the manufacturing facility 3 can recognize whether the operating robot 2 has a malfunction and recognize the type of the malfunction through the display or through the alarm sound or vibrations produced by the voice output unit 15.

The observing person or the maintenance person in the remote place can also recognize whether the operating robot 2 has a malfunction and recognize the type of the malfunction through the display or through the sound produced by the computer 5.

Figure 8:
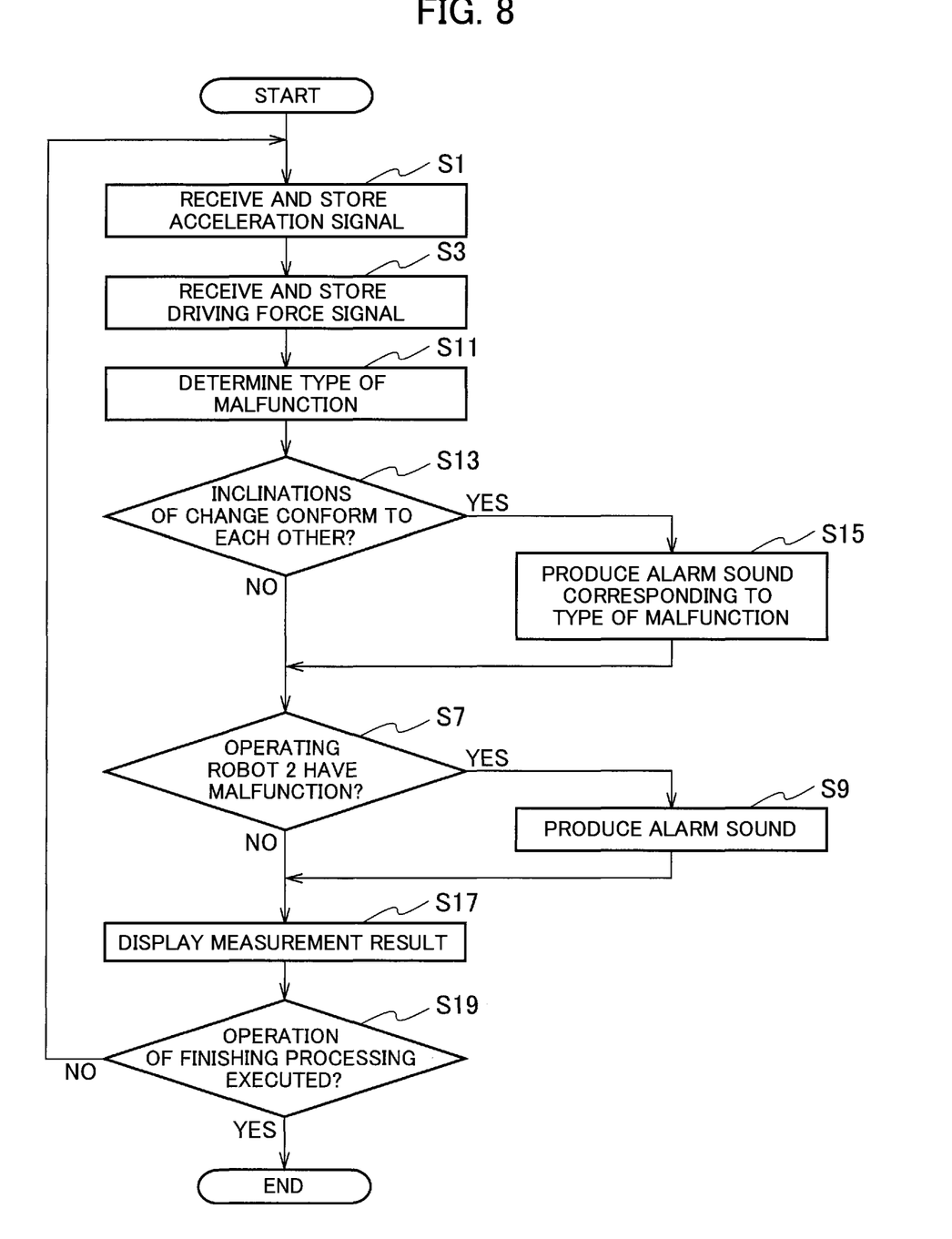
FIG. 8 is a flowchart showing another process performed by the calculation processing unit 13.

Alternatively, the processing in steps S11, S13, and S15 may be performed first, followed by the processing in steps S7 and S9, as illustrated in FIG. 8. Namely, a type of a malfunction may be determined first, followed by the determination of whether the operating robot 2 has the corresponding malfunction.

The type of a malfunction is thus determined prior to the determination of whether the apparatus has a malfunction. This can acquire the frequency of occurrence of the malfunction of each type before the corresponding malfunction appears, so as to enable the estimation of the occurrence of the malfunction.

While the normal model described above is presumed to include the frequency characteristics U' of the average and the frequency characteristics $\delta^2$ of the variance generated from the frequency characteristics when the operating robot 2 is in the normal state, a machine learning unit (not illustrated) may execute machine learning for the acceleration signal M1 and the driving force signal M2 so as to generate the normal model. In particular, the machine learning unit learns the acceleration signal M1 and the driving force signal M2 when the operating robot 2 is in the normal state to extract predetermined characteristics of the acceleration signal M1 and the driving force signal M2, and stores the extracted characteristics as the normal model in the storage unit 17. Alternatively, predetermined characteristics of the acceleration signal M1 and the driving force signal M2 when the operating robot 2 has a malfunction may be extracted and used as a malfunction model, instead of the normal model. The machine learning unit may execute deep learning to learn the signals, or may execute reinforcement learning to learn the signals.

As described above, the malfunction-type determination device 1 according to the embodiment includes the driving force sensor (11) for detecting the driving force of the rotating mechanism (21) provided in the apparatus (2), the vibration sensor (23) for detecting vibrations of the apparatus (2), and the control unit (13) for determining a type of a malfunction of the apparatus in accordance with the combination of the detected driving force and the detected vibrations. The malfunction-type determination device 1 thus can determine the type of a malfunction of the apparatus to execute the malfunction detection with a high accuracy. The accurate detection enables the reaction such as maintenance according to the type of the malfunction of the apparatus. The above malfunction-type determination method performed by the malfunction-type determination device 1 can similarly determine the type of a malfunction of the apparatus to achieve the malfunction detection with a high accuracy.

The determination of the type of a malfunction of the apparatus does not require any people to specify the type of a malfunction, so as to prepare for the maintenance of the apparatus at an early stage, shorten the time for the maintenance operation, and improve the efficiency of the maintenance.

In addition, the driving force detected is derived from the disturbance, so as to determine the type of a malfunction of the apparatus, which changes in the driving force depending on the disturbance, achieving the malfunction detection with a high accuracy.

When the apparatus is determined to have a malfunction, but the malfunction does not conform to any type of the predetermined malfunctions, as indicated by the seven kinds of the malfunctions described above, the malfunction of any other type other than the predetermined malfunctions may be determined to be caused, providing the corresponding determination result. The number of the kinds of the predetermined malfunctions is only required to be plural, and is not limited to seven.

The calculation processing unit 13 determines the type of a malfunction of the apparatus depending on the combination of the inclination of the change in the driving force and the inclination of the change in the vibrations. The type of a malfunction, which varies depending on the combination of the inclination of the change in the driving force and the inclination of the change in the vibrations, thus can be determined so as to execute the malfunction detection with a high accuracy to improve the efficiency of the maintenance of the apparatus.

While the inclination of the change is presumed to include the three kinds of the increase, the decrease, and no change, the inclination may include two kinds (such as the increase and the decrease) or four or more kinds. For example, the increase and the decrease may further be classified according to a gradient of the increase and the decrease.

Since the change in the vibrations refers to a change in magnitude of the vibrations, the type of a malfunction of the apparatus which changes in the magnitude of the vibrations depending on the type of the malfunction can be determined, so as to achieve the malfunction detection with a high accuracy.

The calculation processing unit 13 can determine a leakage of grease in the apparatus, so as to deal with the problem of the grease leakage at an early stage to improve the efficiency of the maintenance of the apparatus.

The calculation processing unit 13 can determine an abnormality in the mechanical part in the apparatus, so as to deal with the problem of the abnormality in the mechanical part at an early stage to improve the efficiency of the maintenance of the apparatus.

The calculation processing unit 13 can determine an abnormality in the concentration of iron filings in the apparatus, so as to deal with the problem of the abnormality in the concentration of iron filings at an early stage to improve the efficiency of the maintenance of the apparatus.

The calculation processing unit 13 can determine an interference between the components in the apparatus, so as to deal with the problem of the interference between the components at an early stage to improve the efficiency of the maintenance of the apparatus.

The calculation processing unit 13 can determine a lack of grease in the apparatus, so as to deal with the problem of the lack of grease at an early stage to improve the efficiency of the maintenance of the apparatus.

The calculation processing unit 13 can determine an abnormality in the rotating mechanism, so as to deal with the problem of the malfunction in the rotating mechanism at an early stage to improve the efficiency of the maintenance of the apparatus.

The calculation processing unit 13 can determine an abnormality in the component other than the rotating mechanism or other than the reducer connected to the rotating mechanism, so as to deal with the problem of the malfunction at an early stage to improve the efficiency of the maintenance of the apparatus.

The calculation processing unit 13 can determine other malfunctions other than the seven kinds of the malfunctions including the leakage of grease in the apparatus, the abnormality in the mechanical part in the apparatus, the abnormality in the concentration of iron filings in the apparatus, the interference between the components in the apparatus, the lack of grease in the apparatus, the abnormality in the rotating mechanism, and the abnormality in the component other than the rotating mechanism or other than the reducer connected to the rotating mechanism. The problems of the malfunctions other than the seven kinds of the malfunctions thus can be dealt with at an early stage to improve the efficiency of the maintenance of the apparatus.

The calculation processing unit 13 determines the first malfunction when the acceleration (the vibrations) shows no inclination toward the increase or the decrease, and the driving force shows the inclination toward the decrease. The calculation processing unit 13 determines the second malfunction when the acceleration (the vibrations) shows the inclination toward the increase, and the driving force shows no inclination toward the increase or the decrease. The calculation processing unit 13 determines the third malfunction when the acceleration (the vibrations) shows no inclination toward the increase or the decrease, and the driving force shows the inclination toward the increase. The calculation processing unit 13 determines the fourth malfunction when the acceleration (the vibrations) shows the inclination toward the increase, and the driving force shows the inclination toward the increase.

The calculation processing unit 13 determines the fifth malfunction when the acceleration (the vibrations) shows the inclination toward the increase, and the driving force shows the inclination toward the decrease. The calculation processing unit 13 determines the sixth malfunction when the acceleration (the vibrations) shows the inclination toward the decrease, and the driving force shows the inclination toward the increase. The calculation processing unit 13 determines the seventh malfunction when the acceleration (the vibrations) shows the inclination toward the decrease, and the driving force shows no inclination toward the increase or the decrease.

The seven kinds of the malfunctions thus can be determined that vary depending on the combination of the inclination of the change in the acceleration (the vibrations) and the inclination of the change in the driving force.

The first malfunction is the leakage of grease in the apparatus, and the second malfunction is the abnormality in the mechanical part in the apparatus. The third malfunction is the abnormality in the concentration of iron filings in the apparatus, and the fourth malfunction is the interference between the components in the apparatus. The fifth malfunction is the lack of grease in the apparatus, and the sixth malfunction is the abnormality in the rotating mechanism. The seventh malfunction is the abnormality in the component other than the rotating mechanism or other than the reducer connected to the rotating mechanism.

The calculation processing unit 13 thus can determine the leakage of grease in the apparatus, the abnormality in the mechanical part in the apparatus, the abnormality in the concentration of iron filings in the apparatus, the interference between the components in the apparatus, the lack of grease in the apparatus, the abnormality in the rotating mechanism, and the abnormality in the component other than the rotating mechanism or other than the reducer connected to the rotating mechanism.

The calculation processing unit 13 includes the measurement result output unit 133 which outputs the type of the malfunction determined, so as to notify the operator or the observing person of the type of the malfunction. The above embodiment thus can deal with the problem with the notification of the state of the malfunction detection to the operator or the observing person by use of both data of the disturbance torque and the acceleration.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

The apparatus as a determination target regarding a malfunction and the type of the malfunction is not limited to the operating robot 2. An engine of a vehicle instead of the motor or a transmission instead of the reducer may be applicable as a target, for example. Any of apparatuses having a rotating mechanism and a transmission mechanism, such as a rotating mechanism of a moving object, a moving object such as playground equipment in an amusement park, and a work machine such as a three-dimensional printer, may be a target to be determined. Any other types of apparatus may also be a target to be determined.

The malfunction-type determination device 1 may be installed in a remote place, as in the case of the computer 5, to receive/send necessary signals or data via a communication line so as to determine a type of a malfunction of the apparatus. The single malfunction-type determination device 1 may determine a type of a malfunction of a plurality of apparatuses. The plural apparatuses may be installed in different places. The functional block including the motor control unit 11, the sensor control unit 12, and the calculation processing unit 13, for example, may be implemented by a computer.

The determination of the type of a malfunction by the malfunction-type determination device 1 may also be applied to a prediction or an estimation of a breakdown. For example, when the time from an occurrence of a predetermined type of malfunction to a breakdown is already known, the determination of the type of the malfunction can be the prediction or the estimation of the breakdown.

The respective functions described in the embodiments can be implemented in single or plural processing circuits. The respective processing circuits include a programmed processing device, such as a processing device including an electric circuit. The processing device includes an application-specific integrated circuit (ASIC) configured to execute the functions described in the above embodiment or conventional circuit components.

REFERENCE SIGNS LIST

1 MALFUNCTION-TYPE DETERMINATION DEVICE
2 OPERATING ROBOT (APPARATUS)
11 MOTOR CONTROL UNIT (DRIVING FORCE SENSOR)
12 SENSOR CONTROL UNIT
13 CALCULATION PROCESSING UNIT (CONTROL UNIT)
14 DISPLAY UNIT
15 VOICE OUTPUT UNIT
16 COMMUNICATION UNIT
17 STORAGE UNIT
21 MOTOR (ROTATING MECHANISM)
22 REDUCER
23 SENSOR (VIBRATION SENSOR)
131 MALFUNCTION DETERMINATION UNIT
132 MALFUNCTION-TYPE DETERMINATION UNIT
133 MEASUREMENT RESULT OUTPUT UNIT
140 MEASUREMENT RESULT
$d1, d2$ AVERAGE VALUE
$f1, f1', U', \delta^2$ FREQUENCY CHARACTERISTICS
M1 ACCELERATION SIGNAL
M2 DRIVING FORCE SIGNAL
$t1, t2$ PERIOD

The invention claimed is:

1. A malfunction-type determination device comprising:
a driving force sensor configured to detect a driving force in a rotating mechanism provided in an apparatus;
a vibration sensor configured to detect vibrations of the apparatus; and
a control unit configured to:
calculate a first average of values in a first period, and calculate a second average of values in a second period after the first period for each of the detected driving forces and the detected vibrations,
calculate a quotient of the second average and the first average,
compare the quotient with a first preset value and a second preset value to detect whether an inclination of a change in each of the detected driving forces and the detected vibrations with a lapse of time indicates an inclination toward an increase, an inclination toward a decrease, or no inclination toward the increase or decrease,
determine that the detected driving forces or vibrations show no inclination toward either the increase or the decrease when the quotient is greater than or equal to the first preset value and less than or equal to the second preset value,
determine that the detected driving forces or vibrations show an inclination toward the increase when the quotient is greater than the second preset value,
determine that the detected driving forces or vibrations show an inclination toward the decrease when the quotient is smaller than the first preset value, and
determine a type of a malfunction of the apparatus in accordance with a combination of the inclination of the change in each of the detected driving forces and the detected vibrations with a lapse of time,
wherein the first preset value is a value obtained by subtracting a predetermined value from 1, and the second preset value is a value obtained by adding the predetermined value to 1.

2. The malfunction-type determination device according to claim 1, wherein the driving force is a driving force derived from a disturbance.

3. The malfunction-type determination device according to claim 1, wherein the change in the vibrations is a change in a magnitude of the vibrations.

4. The malfunction-type determination device according to claim 1, wherein the control unit determines one of malfunctions including a leakage of grease in the apparatus, an abnormality in a mechanical part in the apparatus, an abnormality in a concentration of iron filings in the apparatus, an interference between components in the apparatus, a lack of grease in the apparatus, and an abnormality in the rotating mechanism.

5. The malfunction-type determination device according to claim 1, wherein the control unit determines a malfunction which is an abnormality in a component other than the rotating mechanism or other than a reducer connected to the rotating mechanism.

6. The malfunction-type determination device according to claim 1, wherein the control unit determines a malfunction other than seven kinds of malfunctions including a leakage of grease in the apparatus, an abnormality in a mechanical part in the apparatus, an abnormality in a concentration of iron filings in the apparatus, an interference between components in the apparatus, a lack of grease in the apparatus, an abnormality in the rotating mechanism, and an abnormality in a component other than the rotating mechanism or other than a reducer connected to the rotating mechanism.

7. The malfunction-type determination device according to claim 1, wherein the control unit determines that:
a first malfunction is caused when the vibrations show no inclination toward an increase or a decrease, and the driving force shows the inclination toward the decrease;
a second malfunction is caused when the vibrations show the inclination toward the increase, and the driving force shows no inclination toward the increase or the decrease;
a third malfunction is caused when the vibrations show no inclination toward the increase or the decrease, and the driving force shows the inclination toward the increase;
a fourth malfunction is caused when the vibrations show the inclination toward the increase, and the driving force shows the inclination toward the increase;
a fifth malfunction is caused when the vibrations show the inclination toward the increase, and the driving force shows the inclination toward the decrease;
a sixth malfunction is caused when the vibrations show the inclination toward the decrease, and the driving force shows the inclination toward the increase; and
a seventh malfunction is caused when the vibrations show the inclination toward the decrease, and the driving force shows no inclination toward the increase or the decrease.

8. The malfunction-type determination device according to claim 7, wherein:
the first malfunction is a leakage of grease in the apparatus;
the second malfunction is an abnormality in a mechanical part in the apparatus;
the third malfunction is an abnormality in a concentration of iron filings in the apparatus;
the fourth malfunction is an interference between components in the apparatus;
the fifth malfunction is a lack of grease in the apparatus;
the sixth malfunction is an abnormality in the rotating mechanism; and
the seventh malfunction is an abnormality in a component other than the rotating mechanism or other than a reducer connected to the rotating mechanism.

9. The malfunction-type determination device according to claim 1, wherein the control unit includes a measurement result output unit configured to output the type of the malfunction determined.

10. A malfunction-type determination method of a malfunction-type determination device configured to determine a type of a malfunction of an apparatus including a rotating mechanism, the method comprising:
detecting a driving force in the rotating mechanism;
detecting vibrations in the apparatus;
calculating a first average of values in a first period, and calculating a second average of values in a second period after the first period for each of the detected driving forces and the detected vibrations;
calculating a quotient of the second average and the first average,
comparing the quotient with a first preset value and a second preset value to detect whether an inclination of a change in each of the detected driving forces and the detected vibrations with a lapse of time indicates an inclination toward an increase, an inclination toward a decrease, or no inclination toward the increase or decrease,
determining that the detected driving forces or vibrations show no inclination toward either the increase or the decrease when the quotient is greater than or equal to the first preset value and less than or equal to the second preset value,
determining that the detected driving forces or vibrations show an inclination toward the increase when the quotient is greater than the second preset value,
determining that the detected driving forces or vibrations show an inclination toward the decrease when the quotient is smaller than the first preset value, and
determining the type of the malfunction of the apparatus in accordance with a combination of the inclination of the change in each of the detected driving forces and the detected vibrations with a lapse of time,
wherein the first preset value is a value obtained by subtracting a predetermined value from 1, and the second preset value is a value obtained by adding the predetermined value to 1.

* * * * *